July 9, 1957
L. H. FLORA
2,798,271
SEPARABLE FASTENER
Filed Oct. 30, 1953
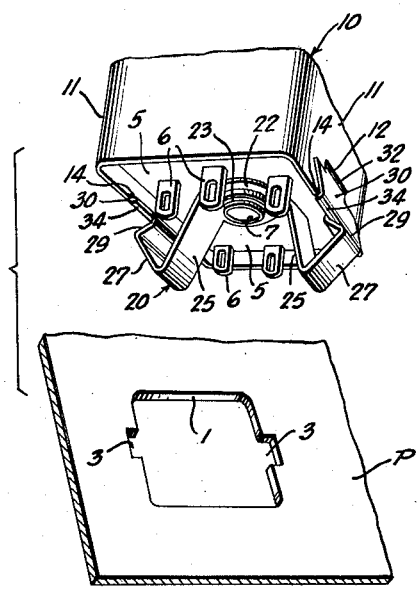
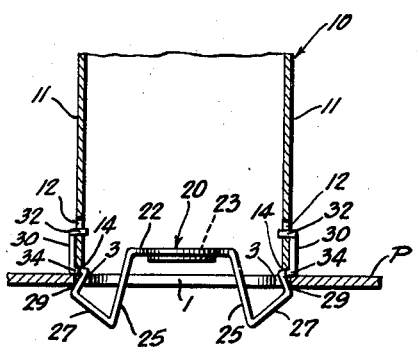
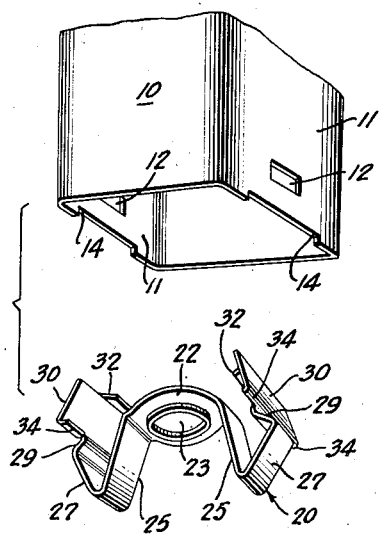
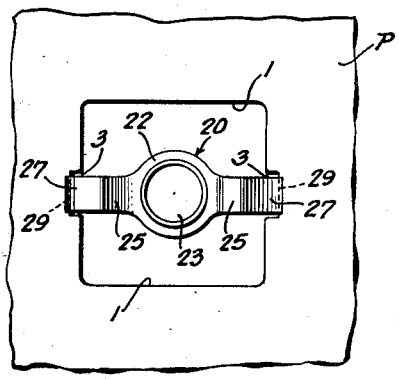
INVENTOR
LAURENCE H. FLORA
BY *H. G. Lombard*
ATTORNEY

United States Patent Office 2,798,271
Patented July 9, 1957

2,798,271
SEPARABLE FASTENER

Laurence H. Flora, Cleveland, Ohio, assignor to Tinnerman Products, Inc., Cleveland, Ohio, a corporation of Ohio Application October 30, 1953, Serial No. 389,285

5 Claims. (Cl. 24—73)

This invention relates in general to improvements in fastening devices for detachably mounting an object or part onto an apertured supporting part and is directed, more particularly, to an improved clip or fastener for securing an instrument such as an electrical unit contained within a can or shield, or the like, to be detachably mounted on the chassis of a radio or television apparatus, for example, in a manner whereby the can or shield is adapted to be secured in a quick and easy snap fastening action and is capable of ready release and removal for servicing or repair of the instrument within the can or shield.

While the invention is disclosed in connection with the mounting means for a can or shield housing an electrical unit such as is used in radio, television and like apparatus, it will be understood that the invention is not so limited and is equally adaptable to various other applications and uses for detachably mounting or releasably securing any similar object or part in an assembly of this general character.

A primary object of the invention is to provide an improved fastening device, of the kind described, in the form of a unitary one-piece clip or fastener which is adapted to be attached across the open end of a can or shield or like part in a simplified relatively inexpensive construction and arrangement, and which defines a pair or more of spaced resilient studs or shank elements adapted for snap fastening engagement with a support for releasably securing the can, shield, or other part in a completed mounting on the support.

Another object of the invention is to provide such a clip or fastener in a removable mounting for a can or shield, or the like, while also accommodating an instrument or other object or part contained within the can or shield and, where necessary, with elements of the instrument extending through the same opening in the support in which the clip or fastener is secured.

A further object of the invention is to provide a clip or fastener, as and for the purposes aforesaid, in which the free ends of the strip forming the clip are provided in an improved highly simplified construction and arrangement for attaching the same to the can, shield or other part in self-sustained position thereon without need for rivets, bolts, screws or other extraneous attaching means.

Further objects and advantages, and other new and useful features in the construction, arrangement and general combination of elements and parts of the invention will be apparent as the following description proceeds with reference to the accompanying drawings, for purposes of illustration but not of limitation, in which like reference characters designate like parts throughout, and in which:

Fig. 1 is a fragmentary perspective view showing the lower portion of a can or shield housing an electrical instrument and with a clip or fastener in accordance with the invention attached to the open end of the can or shield and in position to be secured in an opening in a panel or other support to mount the can and instrument thereon;

Fig. 2 is a perspective view showing the lower end portion of the can or shield and a clip or fastener in accordance with the invention in position to be attached thereto;

Fig. 3 is a vertical sectional view of a completed mounting of the can or shield with the instrument omitted for clarity in illustrating the function of the elements of the clip or fastener as attached in the opening in the panel or other support; and, Fig. 4 is a bottom plan view of Fig. 3 showing the elements of the clip or fastener securing the same in the panel opening.

Referring now, more particularly, to the drawings, a clip or fastener in accordance with the invention is shown as employed with a can or shield, designated generally 10, to provide a removable mounting for the can or shield on a supporting part P in the form of a panel, or the like. The panel P is prepared with an opening 1 including diametrically opposed slots 3 for receiving the securing elements of the clip or fastener 20 in the applied position thereof, as presently to be described.

In the present example, Fig. 1 shows the can or shield 10 as employed as a housing for an electrical unit comprising a block 5 carrying contacts, terminals or other elements 6 which project from the underface thereof and extend through the panel opening 1 in the completed mounting of the instrument on said panel P. The can or shield 10 may be of any suitable character and usually is provided in the form of a metal tube having an open lower end which fits over said instrument block 5 and encloses the instrument in the manner of a protective casing or housing. Adjacent the open lower end of the can 10, opposite walls 11 thereof are provided with recesses 12 for engagement with attaching elements on the clip or fastener 20, while the adjoining end portions of the can are formed with cutouts 14 which clear the body of said fastener 20, as shown in Fig. 3, so that the open end of the can 10 may directly contact the supporting part P and rest firmly and rigidly thereon as secured in its applied mounted position.

It will be understood that the instrument block 5, Fig. 1, may be the similar or equivalent portion of any other instrument or article to be mounted in operative position on the supporting part P together with such a protective shield, housing, casing or other member 10 which is releasably secured to said panel P so that it may be readily removed for servicing or repairing the instrument or other article within the can 10.

The preferred form of clip or fastener 20 is particularly advantageous in that it is a simple one-piece device embodying all the required fastening elements for attaching the same to the can or shield 10 and for securing the same over the panel opening 1 without need for rivets or screws or other extraneous fasteners. The clip or fastener 20 is readily provided as a simple, inexpensive one-piece device which may be made of any suitable sheet metal, preferably spring metal or cold rolled metal having spring-like characteristics. The clip or fastener 20 may be formed from various types of blanks but from a low cost quantity production standpoint is most advantageously provided from a small generally rectangular blank which may be readily stamped from standard sheet metal strip stock with little loss or waste of material.

The clip or fastener 20, as best seen in Fig. 2, is provided by stamping and bending such a blank to define a central base 22 having a passage 23 preferably defined by an outward flare bordering said passage 23. As illustrated in Fig. 1, when the clip 20 is attached to the can 10, this base 22 of the clip 20 is adapted to seat against the instrument block 5 with the passage 23 therein receiving a projecting collar 7, stud or similar element of the instrument such as an adjustable tuning core which projects from the underside of the instrument block 5.

The clip 20 is provided with such a base portion 22 together with integral diametrically opposite strip-like extensions of a width slightly less than the width of the slots 3 in the panel opening 1. These strip-like extensions are bent to define a pair of generally V-shaped shank elements each comprising an arm or leg 25 depending from said base portion 22 and merging into an outward return bent spring arm 27. The spring arms 27 extend outwardly in diverging relation and define guide surfaces leading to inwardly inclined cam shoulders 29 adjoining wider plate-like flanges 30 on the ends of the strip.

The upper ends of said flanges 30 are provided with lugs or projections which are bent inwardly to define hooks or tabs 32, or the like, receivable in the recesses 12 in the walls 11 of the can 10 in engagement with the adjacent edges of said recesses 12. The lower ends of said flanges 30 are bent inwardly adjacent the cam shoulders 29 to define inwardly projecting abutments 34 which are receivable in the cutouts 14 in the lower end of the can 10 and engage the adjacent edges of said cutouts 14 in cooperation with the hooks or tabs 32 received in the recesses 12. The arrangement is such that the hooks 32 are of such width as to be snugly received in the recesses 12 and thereby retained against lateral shifting or displacement when attached to the spaced walls 11 of the can 10. Similarly, the inwardly projecting abutments 34 are so provided as to be receivable in the cutouts 14 in close relation to the adjacent side edges of said cutouts 14 and substantially flush with the adjacent edges of the open end of the can 10, so that said open end of the can may directly contact the supporting panel P and rest firmly and rigidly thereon in its applied mounted position.

The various parts described in the foregoing are easily and quickly assembled to provide the mounting of the can or shield 10 on the supporting panel P together with the instrument or other object positioned therein. The instrument is assembled in the open end of the can and secured therein in any suitable manner, or is retained therein by the clip or fastener 20 in attached position on the lower end of the can as illustrated in Fig. 1. The spring arms 27 of the clip and the flanges 30 carried thereby have a normal untensioned spacing less than the distance between the spaced walls 11 of the can 10 and accordingly, said spring arms 27 are spread apart as necessary to slip the flanges 30 over the outer faces of said spaced walls 11 of the can with the hooks or tabs 32 received in the recesses 12 and the abutments 34 in position to seat in the cutouts 14 in the lower end of the can. This is readily accomplished simply by positioning the hook 32 on one flange 30 in the recess 12 in the associated wall 11 of the can, and spreading the other flange 30 outwardly as necessary to position the hook 32 thereon in the recess 12 in the other wall 11 of the can. In this relation, the fastener base 22 extends inwardly within the can in engagement with the instrument block 5 to retain the instrument in assembled relation in the can and with the passage 23 in said fastener base 22 receiving the projecting collar 7, stud or similar element of the instrument such as an adjustable tuning core projecting from the underside of said instrument block 5.

In such initially attached position of the clip or fastener 20 on the can, the flanges 30 of the clip diverge outwardly in slightly spaced relation to the adjacent outer faces of the walls 11 of the can while the hooks or tabs 32 are retained in the recesses 12 under tension supplied by the expanded spring arms 27 attempting to assume their normal untensioned relation. The clip or fastener 20, as thus attached to the lower end of the can 10, appears substantially as shown in Fig. 1, and in this relation the spring arms 27 in the area of the cam shoulders 29 have a spacing greater than the spacing between the ends of the slots 3 of the panel opening 1. However, the leading ends of said spring arms 27 taper inwardly to a spacing considerably less than the spacing between the ends of the slots 3 in the panel opening 1 and otherwise are of a width slightly less than the width of said slots 3 so as to be readily received therein, as aforesaid.

Accordingly, in securing the clip 20 in said panel opening 1 to complete the mounting of the can 10 and the instrument therein, said clip, as attached to the can 10, is positioned over said panel opening 1 with the leading ends of said spring arms 27 received in the slots 3. As the clip 20 is pushed inwardly into said panel opening 1 to fully applied position, the diverging relation of said spring arms 27 enables the same to serve as guide surfaces which slide against the ends of the slots 3 in a camming action to cause a gradual contraction of said spring arms as necessary for the cam shoulders 29 to pass into said slots 3 and engage the lower corner edges of said slots 3 or the marginal portions of the panel P adjacent said slots as shown in Figs. 3 and 4.

At the same time, as the spring arms 27 are compressed toward each other in the applied position of the clip, the flanges 30 carried thereby are moved into clamping engagement with the adjacent outer faces of the spaced walls 11 of the can in a manner whereby the hooks 32 are positively retained in the recesses 12 and the abutments 34 enter into the cutouts 14 on the lower end of said can 10. The lower end of the can 10, otherwise, bears directly on the panel area surrounding the panel opening 1 under influence of the cam shoulders 29 of the spring arms 27 of the clips as secured in the slots 3 of said panel opening, and accordingly, the can 10 has a firm and rigid seating on said panel P in mounted position under continuously effective spring tension against loosening or displacement even under extreme conditions of vibration and shock.

Preferably, the axial movement of the clip 20 within the panel opening is limited by the abutments 34 on the flanges 30. The abutments 34 extend beyond the dimensions of the slots 3 and thereby engage the panel P to limit the axial movement of the clip in the panel opening to the position in which it is properly seated therein in most effective fastening position. Thus, in the applied position of the clip 20, the abutments 34 bear upon the panel P at both sides of the slots 3 and cooperate with the cam shoulders 29 in engaging the opposite surfaces of the panel adjacent said slots 3 to retain the clip against axial movement in either direction so that the can 10 or other object is firmly and rigidly held in mounted position on said panel P.

The shoulders 29 on the arms of the clip may be provided in a more pronounced formation, if desired, to engage material portions of the undersurface of the panel adjacent the slots 3 in a more positive lock of the fastener in secured position. However, the provision of such shoulders in the manner of cam shoulders 29, as shown and described, is advantageous in that these cam shoulders adapt the clip or fastener for effective application to panels of different thicknesses, within limits, and otherwise provide for an axial drawing action on the spring arms 27 to secure the can 10 or other object tightly against the panel P in mounted position.

Removal of the clip or fastener 20 from secured position for access to the can 10 and the instrument therein is easily and quickly effected simply by compressing the spring arms 27 or otherwire manipulating the can 10 as necessary to cause the cam shoulders 29 to snap over the endes of the slots 3, whereupon said spring arms 27 may be withdrawn from the panel opening 1 and the can 10 removed from mounted position on the panel P. The spring arms 27 of the clip thereupon assume their normal untensioned relation in attached position on the can 10, as aforesaid, and accordingly, may be again applied to mount the can or other part on the panel P in a repetition of the foregoing described procedure.

The clip or fastener 20 preferably is constructed of relatively thin sheet metal the thickness of which is selected according to service requirements and the predetermined size of the parts of the assembly. The clip or fastener is most effective when provided of spring metal suitably spring tempered and otherwise treated to give the desired toughness and hardness, particularly in the case of assemblies which are subject to extreme conditions of vibration. A cheap and highly satisfactory clip or fastener may be provided from cold rolled metal such as cold rolled steel which is untempered but of a spring metal nature and capable of providing an effective and reliable fastening device, as and for the purposes described.

While the invention has been described in detail with a specific example, such example is intended as an illustration only inasmuch as it is quite apparent that various changes may be provided in elements and details of the clip or fastener without departing from the spirit and scope of the invention.

What is claimed is:

1. A clip for securing a member on one side of a support over an opening therein, said member having spaced walls and said opening in the support having a length corresponding substantially to the spacing of said spaced walls on said member, said clip comprising a single piece of sheet metal adapted to extend across the space between said spaced walls on said member and across the length of said opening in the support, said clip having an intermediate bent portion defining a base between a pair of spaced shank elements projecting from the undersurface of said base, said shank elements comprising legs depending from said base and carrying reversely extending spring arms adapted to be secured in said opening in the support by application entirely from the same side of the support on which said member is positioned, and portions on the ends of said spring arms adapted to be attached to said spaced walls on said member to be secured to the support.

2. A clip for securing a member on one side of a support over an opening therein, said member having spaced walls and said opening in the support having a length corresponding substantially to the spacing of said spaced walls on said member, said clip comprising a single piece of sheet metal adapted to extend across the space between said spaced walls on said member and across the length of said opening in the support, said clip having an intermediate bent portion defining a base between a pair of spaced shank elements projecting from the undersurface of said base, said shank elements comprising legs depending from said base and carrying reversely extending spring arms adapted to be secured in said opening in the support by application entirely from the same side of the support on which said member is positioned, and flanges on the ends of said spring arms adapted to be attached to said spaced walls on said member, said flanges defining laterally extending abutments at opposite sides of said spring arms adapted to engage the support adjacent the opening therein in the secured position of said spring arms in said opening.

3. A clip for securing a member on one side of a support over an opening therein, said member having spaced walls and said opening in the support having a length corresponding substantially to the spacing of said spaced walls on said member, said clip comprising a single piece of sheet metal adapted to extend across the space between said spaced walls on said member and across the length of said opening in the support, said clip having an intermediate bent portion defining a base between a pair of spaced shank elements projecting from the undersurface of said base, said shank elements comprising legs depending from said base and carrying outwardly return bent spring arms provided with shoulders for securing said spring arms in said opening in the support by application entirely from the same side of the support on which said member is positioned, flanges on the ends of said spring arms adapted to be attached to said spaced walls on said member, tabs on said flanges receivable in recesses in said spaced walls in the attached position of said flanges on said spaced walls, and laterally extending abutments on said flanges at opposite sides of said spring arms adapted to engage the support adjacent the opening therein in the secured position of said spring arms in said opening, said abutments on said flanges and said shoulders on the spring arms being adapted to cooperate in engaging opposite faces of the support in the secured position of said spring arms in said opening in the support.

4. A clip for securing a member on one side of a support over an opening therein, said member having spaced walls and said opening in the support having a length corresponding substantially to the spacing of said spaced walls and being provided with oppositely located slots at the ends of said opening, said clip comprising a single piece of sheet metal adapted to extend across the space between said spaced walls on said member and across the length of said opening in the support, said clip having an intermediate bent portion defining a base between a pair of spaced shank elements projecting from the undersurface of said base, said shank elements comprising legs depending from said base and carrying reversely extending spring arms receivable in said slots in the secured position of said spring arms in said opening by application entirely from the same side of the support on which said member is positioned, flanges on the ends of said spring arms adapted to be attached to said spaced walls on said member to be secured to the support, and laterally extending abutments on said flanges at opposite sides of said spring arms adapted to engage the support on opposite sides of said slots in the secured position of said spring arms in said opening.

5. A clip for securing a member on one side of a support over an opening therein, said member having spaced walls and said opening in the support having a length corresponding substantially to the spacing of said spaced walls and being provided with oppositely located slots at the ends of said opening, said clip comprising a single piece of sheet metal adapted to extend across the space between said spaced walls on said member and across the length of said opening in the support, said clip having an intermediate bent portion defining a base between a pair of spaced shank elements projecting from one surface of said base, said shank elements comprising legs depending from said base and carrying outwardly return bent spring arms receivable in said slots and provided with shoulders for engaging the support adjacent said slots in the secured position of said spring arms in said opening by application entirely from the same side of the support on which said member is positioned, flanges on the ends of said spring arms projecting beyond the opposite surface of said base and adapted to be attached to said spaced walls on said member to be secured to the support, tabs on said flanges receivable in recesses in said spaced walls in the attached position of said flanges on said spaced walls, and laterally extending abutments on said flanges at opposite sides of said spring arms adapted to engage the support on opposite sides of said slots in the secured position of said spring arms in said opening, said abutments on said flanges and said shoulders on the spring arms being adapted to cooperate in engaging opposite faces of the support in the secured position of said spring arms in said opening in the support.

References Cited in the file of this patent

UNITED STATES PATENTS

| | | |
|---|---|---|
| 2,520,725 | Judd | Aug. 29, 1950 |
| 2,586,728 | Shepard | Feb. 19, 1952 |
| 2,639,311 | Cook | May 19, 1953 |
| 2,656,577 | Carbary | Oct. 27, 1953 |